US010471477B2

(12) United States Patent
Benyoub et al.

(10) Patent No.: US 10,471,477 B2
(45) Date of Patent: Nov. 12, 2019

(54) METHOD OF SORTING PRE-SORTED MAILPIECES

(71) Applicant: Solystic, Bagneux (FR)

(72) Inventors: Belkacem Benyoub, Palaiseau (FR); Bruno Volta, Gif sur Yvette (FR); Gilles Arcas-Luque, Cachan (FR)

(73) Assignee: SOLYSTIC, Bagneux (FR)

( * ) Notice: Subject to any disclaimer, the term of this patent is extended or adjusted under 35 U.S.C. 154(b) by 180 days.

(21) Appl. No.: 15/423,344

(22) Filed: Feb. 2, 2017

(65) Prior Publication Data

US 2017/0225201 A1 Aug. 10, 2017

(30) Foreign Application Priority Data

Feb. 10, 2016 (FR) ...................................... 1651041

(51) Int. Cl.
*G06K 9/00* (2006.01)
*B07C 7/00* (2006.01)

(52) U.S. Cl.
CPC .......... *B07C 7/005* (2013.01); *G06K 9/00442* (2013.01); *B07C 2301/0083* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 2009/0110284 A1* | 4/2009 | Lamprecht | B07C 3/20 | 382/187 |
| 2012/0116573 A1* | 5/2012 | Benyoub | G06K 9/00449 | 700/224 |
| 2014/0072167 A1* | 3/2014 | Miette | B07C 3/00 | 382/101 |
| 2014/0222192 A1* | 8/2014 | Roch | B65H 39/02 | 700/223 |

FOREIGN PATENT DOCUMENTS

| | | | |
|---|---|---|---|
| DE | 102007038186 | A1 | 2/2009 |
| EP | 1920852 | A2 | 5/2008 |
| WO | 0000300 | A1 | 1/2000 |

OTHER PUBLICATIONS

French Search Report dated Oct. 10, 2016, for Application No. 1651041.

* cited by examiner

*Primary Examiner* — Delomia L Gilliard
(74) *Attorney, Agent, or Firm* — Patterson + Sheridan, LLP

(57) ABSTRACT

The method of sorting pre-sorted mailpieces in a postal sorting machine comprises the steps consisting in: detecting loading in the feed inlet of the machine of a batch of mailpieces pre-sorted by a mailer of the mailpieces on the basis of their delivery addresses; and, in response to said detection, loading, in the reference database of the address recognition system, a lexicon comprising the delivery addresses for only the pre-sorted mailpieces of the batch, and, by means of the monitoring and control unit and for (Continued)

each current mailpiece, comparing the result of the OCR reading with said delivery addresses of the lexicon so as to recognize the delivery address of said current mailpiece.

5 Claims, 2 Drawing Sheets

METHOD OF SORTING PRE-SORTED MAILPIECES

CROSS-REFERENCE TO RELATED APPLICATIONS

This application claims benefit of French patent application number 1651041, filed Feb. 10, 2016, which is herein incorporated by reference.

FIELD OF THE INVENTION

The invention relates to a method of sorting mailpieces in a postal sorting machine, and more particularly pre-sorted mailpieces, said method comprising the steps consisting in loading the mailpieces into a feed inlet of said machine, and in unstacking them one-by-one to cause them, in series, to go past a camera that forms a digital image of a current mailpiece including a delivery address, and then in causing a monitoring and control unit of the machine to operate, which unit, on the basis of the digital image of the current mailpiece, is suitable for automatically reading delivery address data by optical character recognition (OCR), and for comparing the result of that reading with a reference database so as to recognize the delivery address that corresponds to said current mailpiece in order to direct the current mailpiece automatically to a corresponding sorting outlet of the machine.

The method of the invention is, in this example, particularly adapted for being implemented in a delivery or inward-sorting postal center with pre-sorted mail coming from bulk mailers.

BACKGROUND OF THE INVENTION

Description of the Related Art

It is known that mailpieces produced by a bulk mailer for several thousand recipients can be grouped together by the mailer, upstream from the inward sorting at the postal operator's facility, in batches corresponding to main geographical destinations for delivery or inward sorting.

This enables the postal operator to process each batch of pre-sorted mailpieces directly at the postal delivery or inward-sorting center that corresponds to the geographical zone of the batch without having to perform an outward-sorting pass.

During the machine inward sorting, the process of automatically recognizing the delivery addresses on the mailpieces uses all-destination OCR that searches the entire file of postal addresses at national level, which involves long processing time, especially if that requires video coding operations.

When the outward sorting is performed by the postal operator, the inward sorting is started while the mailpieces are being transported from the outward-sorting center to the inward-sorting center in order to save processing time.

With pre-sorted mail, there is no outward sorting, and so the entire processing time for recognizing the addresses must take place at the inward-sorting center, which gives rise to high operating costs for said inward-sorting center.

SUMMARY OF THE INVENTION

An object of the invention is thus to optimize the processing time for processing pre-sorted mail in order to reduce the operating costs at the postal operator's facility.

To this end, the invention provides a method of sorting mailpieces in a postal sorting machine, said method comprising the steps consisting in loading the mailpieces into a feed inlet of said machine, and in unstacking them one-by-one to cause them, in series, to go past a camera that forms a digital image of a current mailpiece including a delivery address, and then in causing a monitoring and control unit of the machine to operate, which unit, on the basis of the digital image of the current mailpiece, is suitable for automatically reading delivery address data by OCR, and for comparing the result of that reading with a reference database so as to recognize the delivery address that corresponds to said current mailpiece in order to direct the current mailpiece automatically to a corresponding sorting outlet of the machine, said method being characterized in that it further comprises the steps consisting in:

- detecting loading in the feed inlet of the machine of a batch of mailpieces pre-sorted by a mailer of the mailpieces on the basis of their delivery addresses; and
- in response to said detection, loading, in the reference database, a lexicon comprising the delivery addresses for only the pre-sorted mailpieces of the batch, and, by means of the monitoring and control unit and for each current mailpiece, comparing the result of the OCR reading with said delivery addresses of the lexicon so as to recognize the delivery address of said current mailpiece.

The basic idea of the invention is thus to use the bulk mailer's prior knowledge of the delivery addresses of the pre-sorted mailpieces. The bulk mailer produces the mailpieces on the basis of a database of recipient postal addresses that is reliable.

It therefore suffices for the bulk mailer to send to the postal operator a segment of the postal reference database, which segment corresponds, on each occasion, to a batch of mailpieces that are already pre-sorted for a main destination so as to constitute a lexicon of reduced size that is used by automatic address recognition in the postal sorting machine at the postal operator's facility.

Automatic address recognition using the results of the OCR reading is thus based on a lexical search having a small scope, namely a few hundred words or characters, instead of several hundreds of thousands for conventional all-destination recognition, thereby considerably reducing the processing times. This recognition using a small lexicon also makes it possible to tolerate delivery addresses that are not properly structured at syntax level.

The method of the invention may also have the following features:

- in association with the delivery addresses, said lexicon further comprises data specific to the mailer, and, if the recipient address of the current mailpiece cannot be evaluated by detecting similarity with said delivery addresses in the lexicon, the monitoring and control unit compares the result of the OCR reading of the current mailpiece with said data specific to the mailer in the lexicon so as to detect a match and, by association, so as to evaluate the delivery address of said current mailpiece;
- comparing the result of the OCR reading with the delivery addresses of the lexicon, and comparing the result of the OCR reading with the data specific to the mailer are performed in parallel and are combined for evaluating the delivery address of said current mailpiece.
- the method may further comprise a step consisting in inputting into the monitoring and control unit an identifier for identifying said batch of pre-sorted mailpieces, which identifier is associated in the memory of the monitoring and control unit with said lexicon; and the identifier for identifying the batch of pre-sorted mailpieces may be input by machine reading of a bar code, or by any other means such as automatic reading of an identifier or manual inputting of an identifier by an operator.

BRIEF DESCRIPTION OF THE DRAWINGS

The present invention can be better understood and other advantages appear on reading the following description and on examining the accompanying drawings, in which.

DETAILED DESCRIPTION

Figure 1:
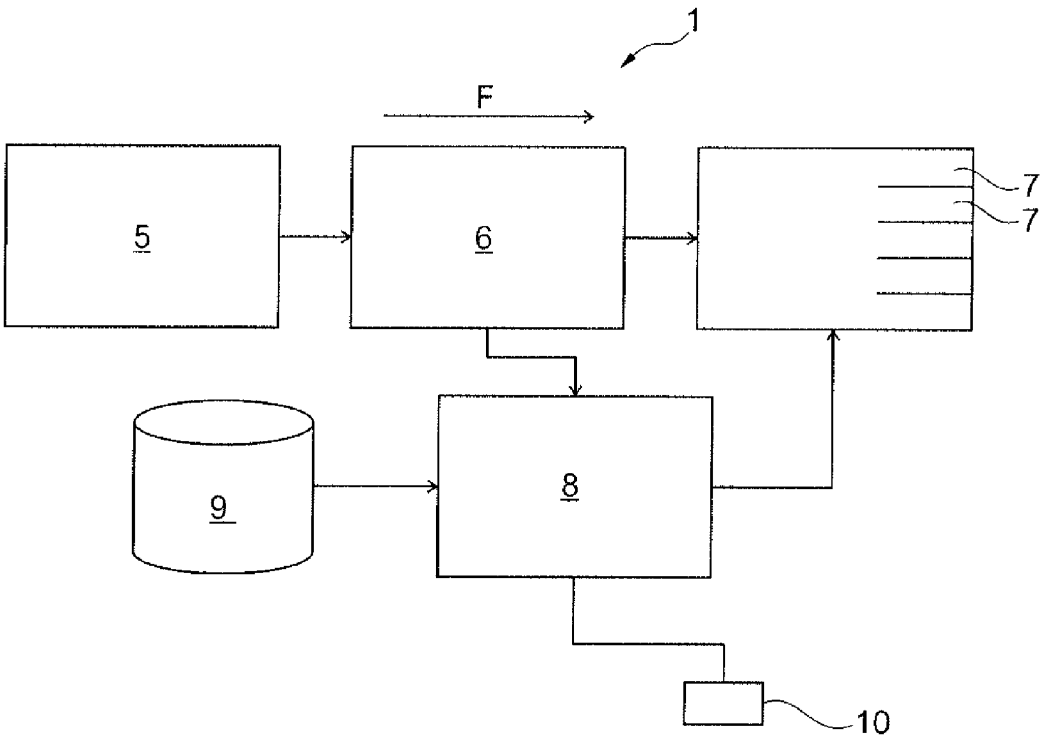
FIG. 1 is a highly diagrammatic view in the form of a block diagram of a postal sorting machine designed for sorting a batch of pre-sorted mailpieces in accordance with the invention.

FIG. 1 is a highly diagrammatic view given by way of example of a postal sorting machine 1 adapted for sorting, in accordance with the invention, mailpieces P that are pre-sorted.

The mailpieces P may be letters, catalogs, parcels, or any other type of mailpiece.

Figure 2:
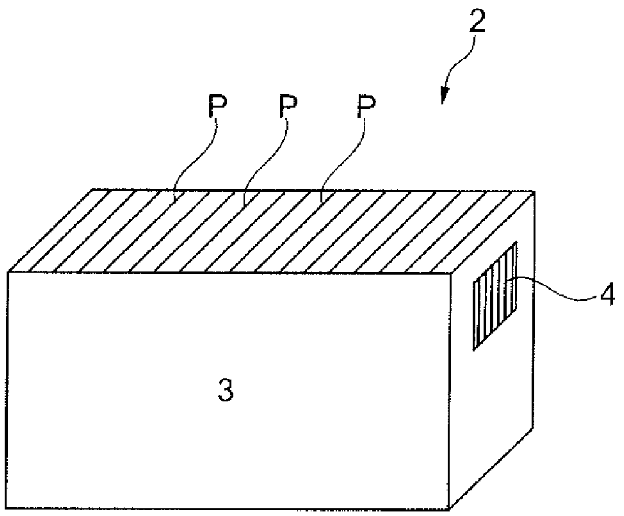
FIG. 2 is a highly diagrammatic view of a batch of pre-sorted mailpieces that is provided with a bar code.

FIG. 2 is a highly diagrammatic view of a batch 2 of pre-sorted mailpieces P that are stored on edge in this example in a storage tray 3 on which a bar code 4 that serves as a unique identifier for identifying the batch of mailpieces is affixed.

As shown in FIG. 1, the sorting machine 1 has a feed inlet 5, a sorting conveyor 6 including an unstacker and an image-taking system and that puts the mailpieces in series and on edge, forms a digital image of each mailpiece that includes a delivery postal address, and moves them in series on edge as indicated by arrow F towards the sorting outlets 7 into which they are sorted as a function of their delivery addresses.

FIG. 1 also shows a monitoring and control and data processing unit 8 of the sorting machine, which unit is suitable for automatically recognizing the delivery address included in the image of a mailpiece, and thus for directing each current mailpiece towards the corresponding sorting outlet 7 in the sorting plan. In this example, the unit 8 is also connected to a bar code reader 10 in order to detect inputting a unique identifier corresponding to a batch of pre-sorted mailpieces.

In practice, with the method of the invention, a mailer produces (using bulk mailing techniques) a batch of mailpieces on the basis of a recipient address database, all of the mailpieces having addresses within a certain geographical zone corresponding to a main postal delivery or inward-sorting destination.

When the batch of mailpieces is formed, the mailer associates the batch with a unique identifier for identifying a batch of pre-sorted mailpieces. The association can be achieved by affixing the unique identify in the form of a bar code on the wall of a storage tray for storing the batch of mailpieces. Without restricting the scope of the invention, the batch identifier may be in the form of an identifier that can be detected automatically or that can be loaded manually by an operator into the unit 8.

Figure 3:
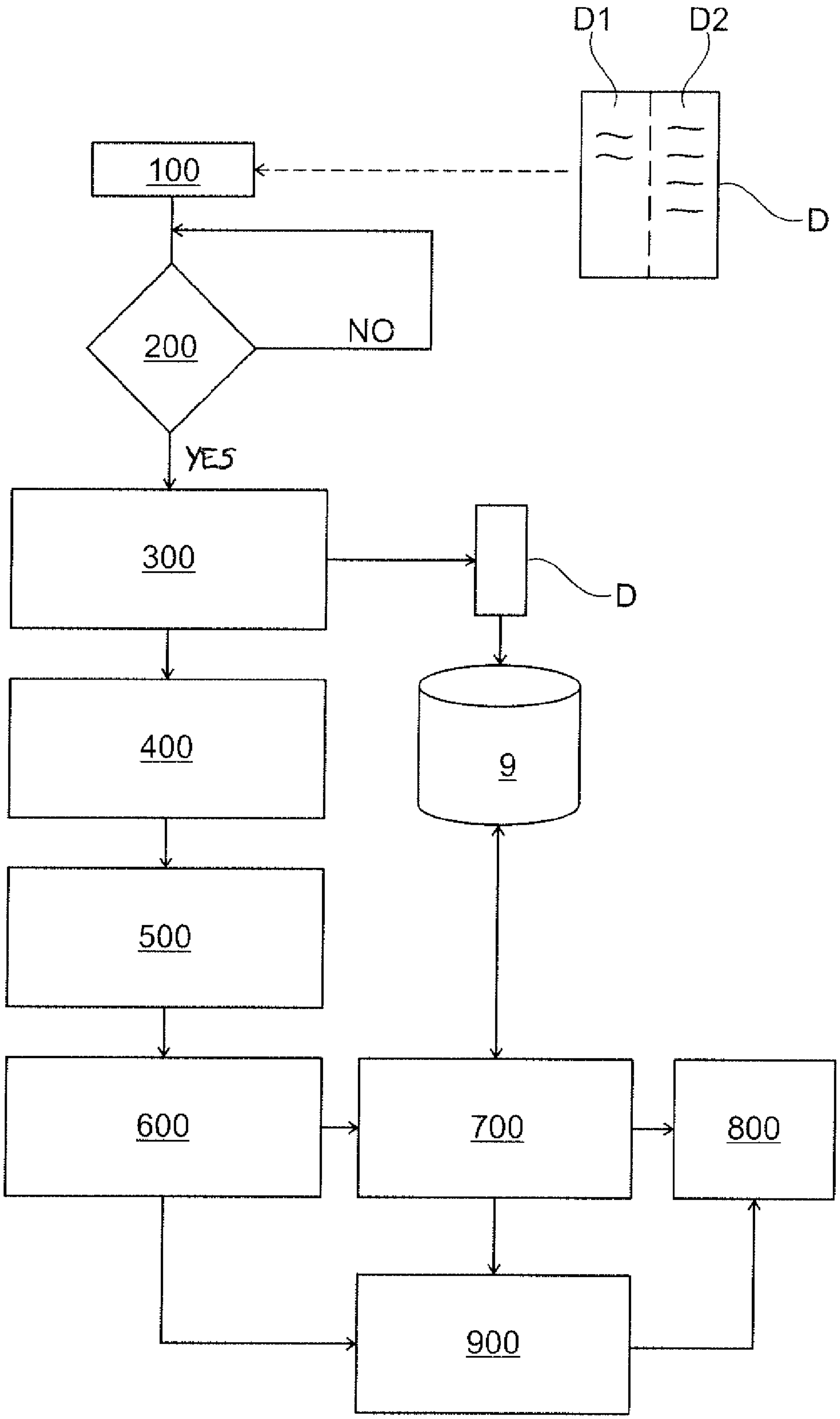
FIG. 3 is a flow chart diagrammatically showing the sorting steps of the invention.

In addition, the mailer builds a lexicon in an electronic file having, for example, the unique identifier of the batch as its logical name, which lexicon is indicated by D in FIG. 3, is quite small in size, and contains all of the postal addresses of the recipients D1 of the mailpieces in the batch. The lexicon may, for example, be seen as a file with data accessible by a word processor.

The identification code for identifying the batch, together with the batch of the pre-sorted mailpieces and the small lexicon are transmitted to the postal operator who is to deliver the mailpieces of the batch. The lexicon may be transmitted by electronic messaging, for example.

The sorting method of the invention that is implemented at the postal operator's facility consists in the following steps, described with reference to FIG. 3.

At 100 in FIG. 3, the mailer of a batch of pre-sorted mailpieces has sent the lexicon D to the postal operator, who records said lexicon D in a memory of the monitoring and control unit 8 of the sorting machine. The postal operator then loads the batch 2 of pre-sorted mailpieces, corresponding to the bar code 4 in this example, into the feed inlet of the sorting machine.

At 200, the code 4 that is read by means of the reader 10 is detected by the unit 8 as being an identification code identifying a batch 2 of pre-sorted mailpieces and so the unit 8 performs special processing of said mailpieces by implementing the following steps.

In response to the detection, in step 300, the unit 8 loads the lexicon D into the reference database 9 of the address recognition system.

In step 400, unstacking of the mailpieces stored in the feed inlet starts, and a current mailpiece P is unstacked and enters the sorting conveyor 6.

In step 500, the image-taking system forms a digital image of the current mailpiece P that includes the delivery address affixed on said mailpiece.

In step 600, the unit 8 performs optical character recognition (OCR) so as to read the postal address data derived automatically from the digital image (from the successions of alphanumeric symbols or characters that can constitute postal address field values: street number, street, postal code, city), and, in step 700, it compares the result of the OCR reading of step 600 with the recipient addresses D1 in the lexicon D so as to evaluate similarity in order to recognize the delivery address that corresponds to said current mailpiece.

After the delivery address has been recognized properly, the process continues in step 800, in which the unit 8 controls the sorting conveyor so as to cause it to direct the current mailpiece P to a corresponding sorting outlet 7.

In a variant embodiment of the invention that is shown in FIG. 3, the lexicon advantageously includes other information that can be affixed on the mailpieces by the mailer, namely, by way of example, a customer code assigned to the recipient by the mailer of the mailpieces (it being possible for the customer code to be succession of numerals and of letters). Such other information is, in general, affixed in the vicinity of the recipient's delivery address data. In FIG. 3, D2 designates such other information that is referred to as "data specific to the mailer". Without restricting the scope of the invention, said data specific to the mailer may also include text data of the delivery address.

In this variant embodiment of the invention, it may be necessary to perform structuring and indexing pre-processing at the mailer's facility or at the postal operator's facility in order to be able to scan through this data by using a standard postal information recognition process.

As shown in FIG. 3, if the recipient address of the current mailpiece cannot be recognized in step 700, the unit 8 then, in step 900, compares the OCR reading result produced in step 600 (delivery address data and data specific to the mailer) with the data D2 in the lexicon D, in order to evaluate matching.

More particularly, in this step 900, it should be understood that a single item of data D2 (in association with a delivery address) may be highly discriminating for match evaluation if it is unique in the lexicon D.

If, in step 900, a match is detected with an item of data D2 in the lexicon D, then the unit 8 retrieves, by association, a corresponding postal address D1 from the lexicon D, and continues the process at step 800.

In practice, the comparisons in steps 700 and 900 can also be performed in parallel (as indicated by the arrow between the blocks 600 and 900 in FIG. 3) in the unit 8 so as to be combined, which enables the evaluation to be made more reliable and enables the good recognition performance to be increased significantly in order to obtain read rates equivalent to those of bar code readers.

It should be noted that, in the lexicon D, the delivery address data D1 may be sequenced in compliance with the sequence of the pre-sorted mailpieces in the batch. The lexicon D in the form of a file may also contain a header that describes the location and orientation of the address block in the image of a mailpiece so as to guide the OCR to a detection zone in the image. It may also contain an indication of the number of mailpieces in the batch, thereby enabling a reliability check to be made.

The invention claimed is:

1. A method of sorting mailpieces in a postal sorting machine, said method comprising the steps of:

loading the mailpieces into a feed inlet of said machine;

unstacking the loaded mailpieces one-by-one to cause the loaded mailpieces, in series, to go past a camera that forms a digital image of a current mailpiece that includes a delivery address thereon;

causing a monitoring and control unit of the machine to:

automatically read delivery address by optical character recognition (OCR) on the basis of the digital image of the current mailpiece, compare the result of the automatic reading with a reference database so as to evaluate the delivery address that corresponds to the current mailpiece, and direct the current mailpiece automatically to a corresponding sorting outlet of the machine based on the comparison;

detecting a loading in the feed inlet of the machine of a batch of mailpieces pre-sorted by a mailer of the batch of mailpieces, the batch of mailpieces having been pre-sorted on the basis of the respective delivery addresses of the mailpieces; and in response to the loading in the feed inlet of the machine of the batch of pre-sorted mailpieces being detected, causing the monitoring and control unit to load, in the reference database, a lexicon comprising the delivery addresses for only the pre-sorted mailpieces of the batch, wherein the monitoring and control unit, for each current mailpiece of the batch of presorted mailpieces, compares the result of the OCR reading with the delivery addresses of the lexicon so as to detect similarity in order to evaluate the delivery address of the current mailpiece of the batch of presorted mailpieces.

2. The method according to claim 1, wherein in association with the delivery addresses, the lexicon further comprises data specific to the mailer, and, if the recipient address of the current mailpiece cannot be evaluated by detecting similarity with the delivery addresses in the lexicon, the monitoring and control unit compares the result of the OCR reading of the current mailpiece with the data specific to the mailer in the lexicon so as to detect a match and, by association, so as to evaluate the delivery address of the current mailpiece.

3. The method according to claim 2, wherein: comparing the result of the OCR reading with the delivery addresses of the lexicon, and comparing the result of the OCR reading with the data specific to the mailer are performed in parallel and are combined for evaluating the delivery address of the current mailpiece.

4. The method according to claim 1, further comprising a step consisting in inputting into the monitoring and control unit an identifier for identifying the batch of pre-sorted mailpieces, which identifier is associated in the memory of the monitoring and control unit with the lexicon.

5. The method according to claim 4, wherein the identifier for identifying the batch of pre-sorted mailpieces is input by machine reading of a bar code.

* * * * *